United States Patent [19]

Burg et al.

[11] 4,082,729

[45] Apr. 4, 1978

[54] PROCESS FOR THE PREPARATION OF OXYMETHYLENE POLYMERS

[75] Inventors: Karlheinz Burg, Naurod, Taunus; Helmut Schlaf, Fischbach, Taunus, both of Germany

[73] Assignee: Hoechst Aktiengesellschaft, Frankfurt am Main, Germany

[21] Appl. No.: 719,078

[22] Filed: Aug. 31, 1976

[30] Foreign Application Priority Data

Sep. 2, 1975 Germany .............................. 2538954

[51] Int. Cl.$^2$ .......................... C08G 2/24; C08G 2/10
[52] U.S. Cl. ................................................ 260/67 FP
[58] Field of Search .................................... 260/67 FP

[56] References Cited

U.S. PATENT DOCUMENTS

| 3,197,420 | 7/1965 | Weissermel et al. ........ 260/67 FP X |
| 3,210,297 | 10/1965 | Fischer et al. .............. 260/67 FP X |

Primary Examiner—Lucille M. Phynes
Attorney, Agent, or Firm—Curtis, Morris & Safford

[57] ABSTRACT

Oxymethylene polymers are prepared by polymerization of trioxane, optionally in the presence of comonomers, with the acid of a cationically active initiator. Suitable initiators are salt-like compounds, especially onium salts of Lewis acids. The initiator is used in the form of a solution in a cyclic carbonic acid ester present in a liquid phase. The oxymethylene polymers are thermoplastic and may be used as engineering materials.

4 Claims, No Drawings

PROCESS FOR THE PREPARATION OF OXYMETHYLENE POLYMERS

It is known that high molecular weight polyacetals may be prepared by polymerization of trioxane in the presence of salts of Lewis acids for example oxonium or diazonium salts (Cf. U.S. Pat. No. 3,316,217). Such a polymerization is principally performed in mass, but a small quantity of a solvent for example an aliphatic or aromatic, optionally nitrated or halogenated, hydrocarbon may be used additionally. It is further known that trioxane may be copolymerized with a number of oxacyclic compounds; moreover cyclic esters, for example ethylene glycol carbonate and 1,2-propylene-glycol carbonate, are said to be suitable as comonomers (Cf. Makromolekulare Chem. 84 (1965), page 251).

The present invention provides a process for the preparation of oxymethylene polymers by polymerization of trioxane, optionally together with an acetal compound copolymerizable with trioxane, in the presence of a cationically active salt-like initiator, which comprises using the initiator in the form of a solution in a cyclic carbonic acid ester present in a liquid state of aggregation.

Suitable cyclic carbonic acid esters are preferably those having 5 ring members, especially compounds of the formula (I)

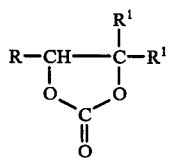

wherein R is a hydrogen atom, a phenyl radical or a lower alkyl radical having preferably 1, 2 or 3 carbon atoms and $R^1$ is a hydrogen atom or a lower alkyl radical having preferably 1, 2 or 3 carbon atoms. There may be mentioned, by way of example, ethylene glycol carbonate, 1,2-propylene glycol carbonate, 1,2-butylene glycol carbonate, 2,3-butylene glycol carbonate, phenyl ethylene glycol carbonate, 1-phenyl-1,2-propylene glycol carbonate, and 2-methyl-1,2-propylene glycol carbonate (1,3-dioxolane-2-one, 4-methyl-1,3-dioxolane-2-one, 4-ethyl-1,3-dioxolane-2-one, 4,5-dimethyl-1,3-dioxolane-2-one, 4-phenyl-1,3-dioxolane-2-one, 4-methyl-5-phenyl-1,3-dioxolane-2-one, and 4,4-dimethyl-1,3-dioxolane-2-one).

The cyclic carbonic acid esters used according to the invention have a purity of at least 95%, preferably of at least 99.9%; they should be substantially anhydrous and free from alkalis. Purification is generally performed by distillation under reduced pressure. To the extent that the purified cyclic carbonic acid esters exist in a solid state under normal conditions they must be liquified by melting for preparation of the initiator solution, which procedure may be carried out by heating them to a temperature of from 5° to 10° C above the melting point of the carbonic acid ester concerned.

A temperature in the range of from 35° to 100° C, preferably of from 45° to 80° C will be sufficient generally.

As cationically active initiators there by may be used especially onium salts of Lewis acids, particularly oxonium, carbonium and diazonium salts of tetrafluoroboric acid, hexafluorophosphoric acid, hexafluoroantimonic acid and hexafluoroarsenic acid. There may be mentioned, by way of example, triethyloxonium tetrafluoroborate, trimethyloxonium tetrafluoroborate, trimethyloxonium hexafluorophosphate, trimethyloxonium hexafluoroantimonate, trimethyloxonium hexafluoroarsenate, triphenylcarbonium tetrafluoroborate, triphenylcarbonium hexafluorophosphate, triphenylcarbonium hexafluoroantimonate, triphenylcarbonium hexafluroarsenate, acetyltetrafluoroborate, acetylhexafluorophosphate, acetylhexafluoroarsenate, acetylhexafluoroantimonate, tropyliumtetrafluoroborate, phenyldiazonium tetrafluoroborate, p-nitrophenyldiazonium tetrafluoroborate, p-methoxyphenyldiazonium tetrafluoroborate, phenyldiazonium hexafluorophosphate, phenyldiazonium hexafluoroanitmonate and phenyldiazonium hexafluoroarsenate.

The quantity of the initiator used according to the invention depends on its efficiency and is in the range of from 1 to 2,000, preferably of from 2 to 500 ppm, calculated on the total amount of the compounds to be polymerized. Very efficient initiators are advantageously used in an amount of from 5 to 150, preferably 10 to 100 ppm. The initiator is generally present in the solution in an amount of from 0.1 to 50, preferably of from 5 to 20% by weight.

The polymerization process according to the invention is carried out in, bulk, suspension or in solution. It is performed at a temperature ranging between the melting point and the boiling point of trioxane, preferably at a temperature of from 65° to 100° C. The process is preferably carried out in an inert gas atmosphere with the exclusion of humidity. Suitable inert gases are especially noble gases, for example argon, and nitrogen.

The acetal compounds copolymerizable with trioxane are either cyclic acetals, preferably formals, having from 5 to 11, preferably 5, 6, 7 or 8 ring members or linear polyacetals, preferably polyformals. Cyclic formals of the formula (II)

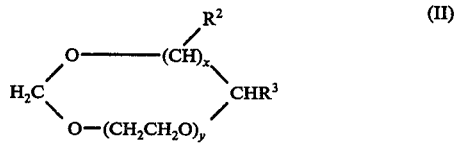

wherein $R^2$ and $R^3$ are identical or different and each mean a hydrogen atom, a phenyl radical or a lower alkyl radical having preferably 1, 2 or 3 carbon atoms and (a) x is an integer of from 1 to 7, preferably 1, 2, 3 or 4, and y is 0 or (b) x is 1 and y is 1, 2 or 3.

Suitable cyclic formals include, for example, 1,3-dioxolane, 1,3-dioxane, 1,3-dioxepane, and 1,3,6-trioxocane as well as 4-methyl-1,3-dioxolane, 4-phenyl-1,3-dioxolane, 1,3-dioxonane and 1,3-dioxacycloheptane-(5). Suitable linear polyformals are especially poly(1,3-dioxolane) and poly(1,3-dioxepane).

For preparing oxymethylene polymers having a molecular weight in a specific range, the polymerization is advantageously carried out in the presence of a regulator. For this purpose there may be used especially formaldehydedialkyl acetals having from 3 to 9, preferably 3, 4 or 5 carbon atoms, for example formaldehydedimethylacetal, formaldehydediethylacetal, formaldehydedipropylacetal, and formaldehydedibutylacetal as well as lower aliphatic alcohols, preferably alkanols having from 1 to 4 carbon atoms, for example methanol, ethanol, propanol and butanol. The regulator is usually used in an amount of up to 0.5% by weight, preferably of from 0.005 to 0.1% by weight, calculated on the total quantity of the compounds to be polymerized.

In order to remove unstable portions the oxymethylene polymers are subjected advantageously to a controlled thermal partial degradation yielding primary terminal alcohol groups (Cf. U.S. Pat. Nos. 3,174,948, 3,219,623 and 3,666,714). The thermal treatment is suitably performed at a temperature of from 130° to 200° C, preferably of from 140° to 190° C especially under non-acid conditions, advantageously in the presence of a basic reacting compound, for example ammonia or a low molecular weight tertiary aliphatic amine, for example triethylamine or triethanolamine, or a secondary alkali metal phosphate such as disodium hydrogen phosphate. A temperature in the range of from 150° to 180° C is especially advantageous. The period of the thermal treatment depends on the temperature and ranges from 10 seconds to 2 hours, preferably from 1 minute to 60 minutes. The higher the temperature, the shorter the treatment time. At a temperature of 180° C about 1 to 2 minutes are sufficient, about 5 to 10 minutes at a temperature of 160° C about 10 to 30 minutes at a temperature of about 150° C and about 20 to 60 minutes at a temperature of 140° C. The treatment is preferably effected with substantial complete exclusion of oxygen.

The oxymethylene polymers obtained according to the invention are macromolecular; their reduced specific viscosity (RSV) is in the range of from 0.3 to 2.0, preferably of from 0.5 to 1.5 dl/g (measured with a 0.5% by weight solution of the polymer in γ-butyrolactone, containing 2% by weight of diphenylamine as stabilizer, at a temperature of 140° C). The crystallite melting points of the oxymethylene polymers are in the range of from 140° to 180° C, their melt indices (MFI 190/2) are in the range of from 0.1 to 50, preferably of from 1 to 30 g/10 minutes (measured according to DINGerman Industrial Standard No. 53,735 at a temperature of 190° C under a load of 2.16 kg).

The oxymethylene polymers may be stabilized against the action of heat, oxygen and/or light by mixing them homogeneously with stabilizers. Homogenization usually carried out in a commercial mixing device, for example an extruder, at a temperature above the melting point of the polymer of up to 250° C, preferably of from 180° to 210° C.

The total amount of added stabilizers is in the range of from 0.1 to 10, preferably of from 0.5 to 5% by weight, calculated on the total mixture.

As stabilizers there are especially useful bisphenol compounds, alkaline earth metal salts of carboxylic acids and guanidine compounds. The bisphenol compounds used are preferably esters of monobasic 4-hydroxyphenylalkanoic acids which are substituted on the aromatic nucleus by one or two alkyl radicals having from 1 to 4 carbon atoms and which have from 7 to 13, preferably 7, 8 or 9 carbon atoms, with aliphatic di-, tri- or tetrahydric alcohols having from 2 to 6, preferably 2, 3 or 4 carbon atoms. Examples of such bisphenol compounds are esters of ω-(3-tertiary butyl -4-hydroxyphenyl)pentanoic acid, β-(3-methyl-5-tertiary butyl-4-hydroxyphenyl)propionic acid, (3,5-di-tertiary butyl-4-hydroxyphenyl)acetic acid, β-(3,5-di-tertiary butyl -4-hydroxyphenyl)-propionic acid or (3,5-di-isopropyl-4-hydroxyphenyl)-acetic acid with ethylene glycol, propane diol-(1,2), propane diol-(1,3), butane diol-(1,4), hexane diol(1,6), 1,1,1-trimethylolethane or pentaerythritol.

Suitable alkaline earth metal salts of carboxylic acids are especially alkaline earth metals salts of aliphatic, preferably hydroxyl groups-containing mono-, di- or tribasic carboxylic acids having from 2 to 20, preferably from 3 to 9 carbon atoms, for example the calcium and magnesium salts of stearic acid, ricinoleic acid, lactic acid, mandelic acid or citric acid.

Suitable guanidine compounds are compounds of the formula

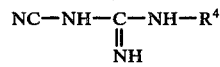

in which $R^4$ is a hydrogen atom, a cyano group or an alkyl radical having from 1 to 6 carbon atoms, for example cyanoguanidine, N-cyano-N'-methyl-guanidine, N-cyano-N'-ethylguanidine, N-cyano-N'-iso-propyl-guanidine, N-cyano-N'-tertiary butyl-guanidine or N,N'-dicyanoguanidine. The guanidine compound is optionally used in an amount of from 0.01 to 1, preferably 0.1 to 0.5% by weight, calculated on the total mixture.

In addition there may added to the oxymethylene polymers prepared according to the invention known light stabilizers such as derivatives of benzophenone, acetophenone or triazine. Other usual additives, for example dyestuffs, pigments, reinforcing materials and fillers, may also be used.

The oxymethylene polymers may be processed by all methods usually employed for thermoplastics, for example by injection molding, extrusion, extrusion flow molding, melt spinning and deep drawing. They are suitable for preparing semi-finished products and finished products such as shaped articles, for example bars, rods, plates, ribbons, bristles, threads, fibers, films, sheets, tubes and flexible tubes, as well as household articles, for example dishes and cups, and machine elements such as casings and gear wheels. They are especially suitable as engineering plastics for preparing dimensionally stable shaped articles.

The following examples illustrate the invention:

EXAMPLE 1

0.3 ml of a solution of 50 mg triphenylmethyl hexafluoroarsenate in 20 ml of ethylene glycol carbonate at 45° C. was added to a mixture of 97 g of trioxane and 3 g of 1,3-dioxolane heated to 70° C under a nitrogen atmosphere and rapidly dispersed in said mixture homogeneously. The mixture solidified after less than 1 minute to form a rigid block, which was kept at a temperature of 70° C for 5 minutes and thereafter chilled in ice water. The block was fragmented by grinding and the polymer powder obtained was dissolved while stirring in 1 liter of benzyl alcohol containing 1% by weight of triethanolamine, at a temperature of 150° C. The solution was allowed to stay at 150° C for 30 minutes and to cool to 80° C subsequently. About 700 ml of methanol were added and the suspension obtained was filtered with suction at room temperature after cooling. The solid product obtained was boiled three times in methanol and dried thereafter at a temperature of 70° C. The yield was 90%. The polymer had a reduced specific viscosity of 2.0 dl/g, a crystallite melting point of 158° C and a melt index (MFI 190/2) of 0.1 g/10 minutes.

EXAMPLE 2

In a continuously working polymerization apparatus 2 parts by weight of a solution having a temperature of 45° C, and comprising 100 mg of triphenylmethyl hexafluoroantimonate in 100 ml of ethylene glycol carbonate were added to a mixture of 97 parts by weight of trioxane and 3 parts by weight of 1,3-dioxolane heated to 70° C under a nitrogen atmosphere. The polymer that instantly formed was removed from the apparatus after about 1 minute and was chilled in a 5% by weight aqueous ammonia solution. The polymer obtained was then dissolved while stirring at a temperature of 170° C and under a pressure of 20 bars in 90 parts by weight of a mixture of 40 parts by volume of methanol and 60 parts by volume of water with the addition of 500 ppm of triethylamine, calculated on the solvent.

After a residence time of 30 minutes at 170° C the solution was allowed to cool to room temperature, the suspension obtained was suction-filtered, the filter cake was washed three times with methanol and the solid product was dried at a temperature of 70° C. The yield was 85%. The polymer had a reduced specific viscosity of 1.3 dl/g, a crystallite melting point of 157° C and a melt index (MFI 190/2) of 0.3 g/10 minutes.

What is claimed is:

1. In a process for the preparation of oxymethylene polymers by the homopolymerization of trioxane or copolymerization of trioxane and acetal compounds copolymerizable therewith in the presence of a cationically active salt-like initiator, the improvement which comprises using the initiator in the form of a solution in a liquid cyclic carbonic acid ester of the formula

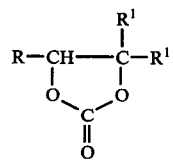

wherein R is selected from hydrogen, phenyl, and alkyl of 1 to 3 carbon atoms, and $R^1$ is selected from hydrogen and unsubstituted alkyl of 1 to 3 carbon atoms.

2. A process according to claim 1 and wherein the initiator solution contains from 0.1 to 50% by weight of initiator.

3. A process according to claim 1 wherein the initiator is used in an amount of 0.0001 to 0.2% by weight, based on the total weight of the polymerization mixture.

4. A process according to claim 1 wherein the cyclic carbonic acid ester is selected from ethylene glycol carbonate, 1,2-propylene glycol carbonate, 1,2-butylene glycol carbonate, 2,3-butylene glycol carbonate, phenyl ethylene glycol carbonate, 1-phenyl-1,2-propylene glycol carbonate, and 2-methyl-1,2-propylene glycol carbonate (1,3-dioxolane-2-one, 4-methyl-1,3-dioxolane-2-one, 4-ethyl-1,3-dioxolane-2-one, 4,5-dimethyl-1,3-dioxolane-2-one, 4-phenyl-1,3-dioxolane-2-one, 4-methyl-5-phenyl-1,3-dioxolane-2-one, and 4,4-dimethyl-1,3-dioxolane-2-one.

* * * * *